United States Patent
Tsai et al.

(10) Patent No.: US 9,851,446 B2
(45) Date of Patent: Dec. 26, 2017

(54) GNSS RECEIVER AND METHOD FOR DETERMINING WHETHER TO SWITCH FROM ONE OPERATION STATE TO ANOTHER OPERATION STATE ACCORDING TO STATE SWITCHING CRITERION AND POSITIONING INFORMATION

(71) Applicant: MEDIATEK INC., Hsin-Chu (TW)

(72) Inventors: Chung-Yen Tsai, Hsinchu (TW); Kung-Shuan Huang, Changhua County (TW); Ching-Lung Fu, Miaoli County (TW); Hung-Jen Chen, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 309 days.

(21) Appl. No.: 14/660,952

(22) Filed: Mar. 18, 2015

(65) Prior Publication Data

US 2015/0346347 A1 Dec. 3, 2015

Related U.S. Application Data

(63) Continuation-in-part of application No. 13/425,429, filed on Mar. 21, 2012, now Pat. No. 9,019,158.

(60) Provisional application No. 61/479,410, filed on Apr. 27, 2011.

(51) Int. Cl.
| | | |
|---|---|---|
| *G01S 19/34* | (2010.01) | |
| *G01S 19/52* | (2010.01) | |
| *G01S 19/09* | (2010.01) | |
| *G01S 19/24* | (2010.01) | |

(52) U.S. Cl.
CPC .............. *G01S 19/34* (2013.01); *G01S 19/24* (2013.01)

(58) Field of Classification Search
CPC .......... G01S 19/09; G01S 19/28; G01S 19/34; G01S 19/42
USPC ............ 342/357.25, 357.35, 357.46, 357.63, 342/357.74; 455/41.2, 277.1
See application file for complete search history.

(56) References Cited

U.S. PATENT DOCUMENTS

2010/0255781 A1 10/2010 Wirola

FOREIGN PATENT DOCUMENTS

| | | |
|---|---|---|
| CN | 1250939 C | 4/2006 |
| JP | H08297159 A | 11/1996 |
| JP | 200437116 A | 2/2004 |
| JP | 2009276198 A | 11/2009 |
| JP | 2010101888 A | 5/2010 |
| TW | 201017204 A1 | 5/2010 |

*Primary Examiner* — Dao Phan
(74) *Attorney, Agent, or Firm* — Winston Hsu (57) ABSTRACT

A method for controlling a GNSS receiver includes: providing a state switching criterion; obtaining at least one positioning information; determining whether to switch from a first operation state to a second operation state according to the obtained positioning information and the state switching criterion, a power consumption of GNSS receiver operating under the first operation state and the second operation state is different; the obtained positioning information includes at least one of a speed value of GNSS receiver, a satellite distribution value of GNSS receiver, a satellite signal strength value of GNSS receiver, a location identification of GNSS receiver, instant motion information from a motion sensor, or location information from a WLAN device, a Bluetooth device or a UV light sensor.

32 Claims, 5 Drawing Sheets

GNSS RECEIVER AND METHOD FOR DETERMINING WHETHER TO SWITCH FROM ONE OPERATION STATE TO ANOTHER OPERATION STATE ACCORDING TO STATE SWITCHING CRITERION AND POSITIONING INFORMATION

CROSS REFERENCE TO RELATED APPLICATIONS

This application is a continuation-in-part of U.S. application Ser. No. 13/425,429, filed Mar. 21, 2012, which claims the benefit of U.S. provisional patent application No. 61/479,410, filed Apr. 27, 2011, the contents of which are hereby incorporated by reference.

BACKGROUND

The present invention relates to a global navigation satellite system (GNSS) receiving scheme, and more particularly to a GNSS receiver and method for dynamically switching the GNSS receiver between different operation states corresponding to different power consumption conditions.

In general, it is not required for a conventional GNSS receiver to constantly perform satellite information collections/updates since performing satellite information collections/updates constantly may improve the positioning accuracy but this have to waste much power. This is a significant defect for the conventional GNSS receiver when installed within an electronic portable device. The conventional GNSS receiver is arranged to perform satellite information collections/updates periodically with a predetermined frequency. That is, a frequency interval between any two continuous satellite information collections performed by the conventional GNSS receiver is fixed. However, performing satellite information collections/updates periodically with a fixed frequency can not save power efficiently. This is because a conventional GNSS receiver may be operated by a user with different user behaviors or under different environment conditions. Since the battery power provided to an electronic portable device in which a GNSS receiver is crucial, a more efficient power saving scheme for the GNSS receiver to effectively reducing unnecessary power consumption is critical.

SUMMARY

Therefore, one of the objectives of the present invention is to provide a GNSS receiver and corresponding method for determining whether to switch from an operation state to another operation state based on user behaviors or environment conditions, so as to achieve reduction of unnecessary power consumption and solve the problems mentioned above.

According to an embodiment of the present invention, a method for controlling a global navigation satellite system (GNSS) receiver operated in a first operation state is disclosed. The method comprises: providing a state switching criterion; obtaining at least one positioning information; determining whether to switch from the first operation state to a second operation state according to the obtained positioning information and the state switching criterion, wherein a power consumption of the GNSS receiver operating under the first operation state and the second operation state is different. The obtained positioning information includes at least one of a speed value of the GNSS receiver, a satellite distribution value of the GNSS receiver, a satellite signal strength value of the GNSS receiver, a location identification of the GNSS receiver, instant motion information from a motion sensor, or location information from a WLAN device, a Bluetooth device or a UV light sensor.

According to the embodiment of the present invention, a global navigation satellite system (GNSS) receiver is disclosed. The GNSS receiver is operated in a first operation state, and comprises a memory, a positioning unit, and a controlling unit. The memory is utilized for providing a state switching criterion. The positioning unit is utilized for obtaining positioning information. The controlling unit is coupled to the positioning unit and the memory and utilized for determining whether to switch from the first operation state to a second operation state according to the obtained positioning information and the state switching criterion, wherein a power consumption of the GNSS receiver operating under the first operation state and the second operation state is different. The obtained positioning information includes at least one of a speed value of the GNSS receiver, a satellite distribution value of the GNSS receiver, a satellite signal strength value of the GNSS receiver, a location identification of the GNSS receiver, instant motion information from a motion sensor, or location information from a WLAN device, a Bluetooth device or a UV light sensor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
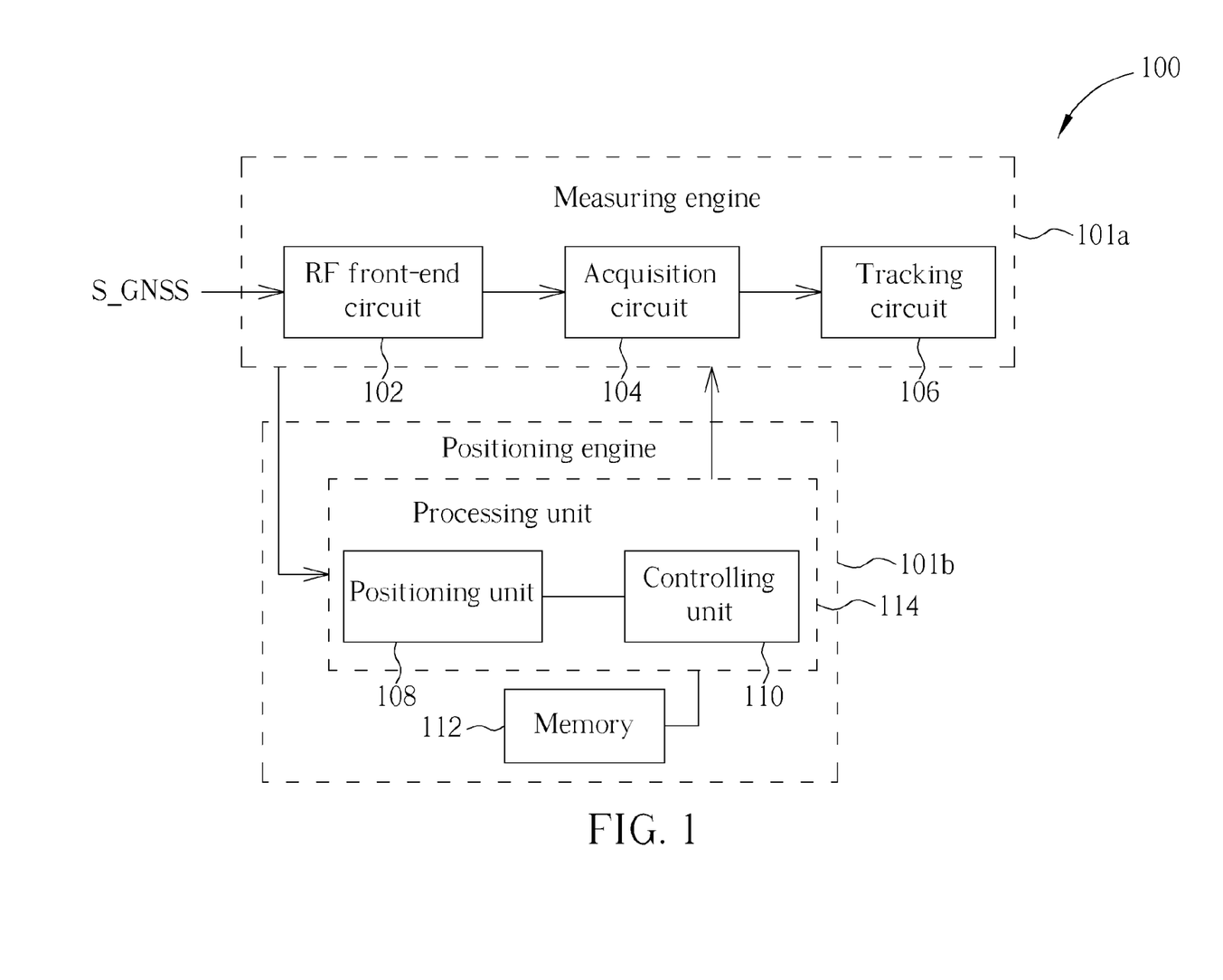
FIG. 1 is a block diagram of a Global Navigation Satellite System (GNSS) receiver according to an embodiment of the present invention.

Please refer to FIG. 1, which is a block diagram of a Global Navigation Satellite System (GNSS) receiver 100 according to an embodiment of the present invention. The GNSS receiver 100 comprises a measuring engine 101a and a positioning engine 101b. The measuring engine 101a comprises a radio-frequency (RF) front-end circuit 102, an acquisition circuit 104, a tracking circuit 106, and the positioning engine 101b comprises a positioning unit 108, a controlling unit 110, and a memory 112. The positioning unit 108 and controlling unit 110 can be implemented by hardware or software; in this embodiment, the positioning unit 108 and controlling unit 110 are implemented by software and executed by the processing unit 114 to provide corresponding functions. The RF front-end circuit 102 is arranged to receive satellite signals S_GNSS from one or multiple satellites located in different positions/locations on the sky. The acquisition circuit 104 is coupled to the RF front-end circuit 102 and arranged to perform an acquisition process on the received satellite signals S_GNSS so as to acquire information of one or multiple satellites. The acquisition circuit 104 includes a set of acquisition channels each used for analyzing GNSS satellite data and determine if a particular satellite is within view of the GNSS receiver 100. The tracking circuit 106 is coupled to the acquisition circuit 104 and arranged to track the positions of satellites in accordance with the acquired information of one or multiple satellites have been found by the acquisition circuit 104. The tracking circuit 106 includes a set of tracking channels each used for tracking the position/location of a satellite found by the acquisition circuit 104. The RF front-end circuit 102, acquisition circuit 104, and the tracking circuit 106 can be regarded as the measuring engine which is used for measuring/detecting the satellite signals S_GNSS of the satellites.

The memory 112 is arranged to provide a state switching criterion. The positioning unit 108 receives signal (s) outputted from the measuring engine 101a, and obtains positioning information based on the received signal (s). The signal (s) outputted from the measuring engine 101a may be generated by the RF front-end circuit 102, acquisition circuit 104, or the tracking circuit 106. In addition, the positioning unit 108 includes a storage element (not shown in FIG. 1) for storing the obtained positioning information. The positioning unit 108 can utilize the storage element to record a history of the obtained positioning information and update the history after the GNSS receiver 100 performs satellite information collection/update each time. The positioning unit 108 then outputs the history to the controlling unit 110 which is arranged to perform the control operation of state switching by referring to the history. In practice, the controlling unit 110 is arranged to check the history of the obtained positioning information stored in the storage element with the state switching criterion so as to generate a checking result, and to determine whether to switch from a first operation state to a second operation state according to the checking result. Power consumption of the GNSS receiver 100 operating under the first operation state is substantially different from power consumption of the GNSS receiver 100 operating under the second operation state. It should be noted that the obtained positioning information described above can be generated from an external source such as one of a cell identifier, a WIFI access point, and a motion sensor, etc. All these modifications fall within the scope of the present invention.

In practice, the GNSS receiver 100 includes multiple operation states respectively corresponding to different power consumption conditions, and the controlling unit 110 can determine whether to switch from one operation state into another operation state according to the checking result generated from the positioning information and the state switching criterion. When the checking result indicates that the history of the obtained positioning information matches the state switching criterion due to a certain event, the controlling unit 110 determines to switch from an operation state into another operation state. More power can be efficiently saved if necessary by switching the GNSS receiver 100 from one operation state into another operation state in accordance with the checking result associated with the history of the obtained positioning information.

Figure 2:
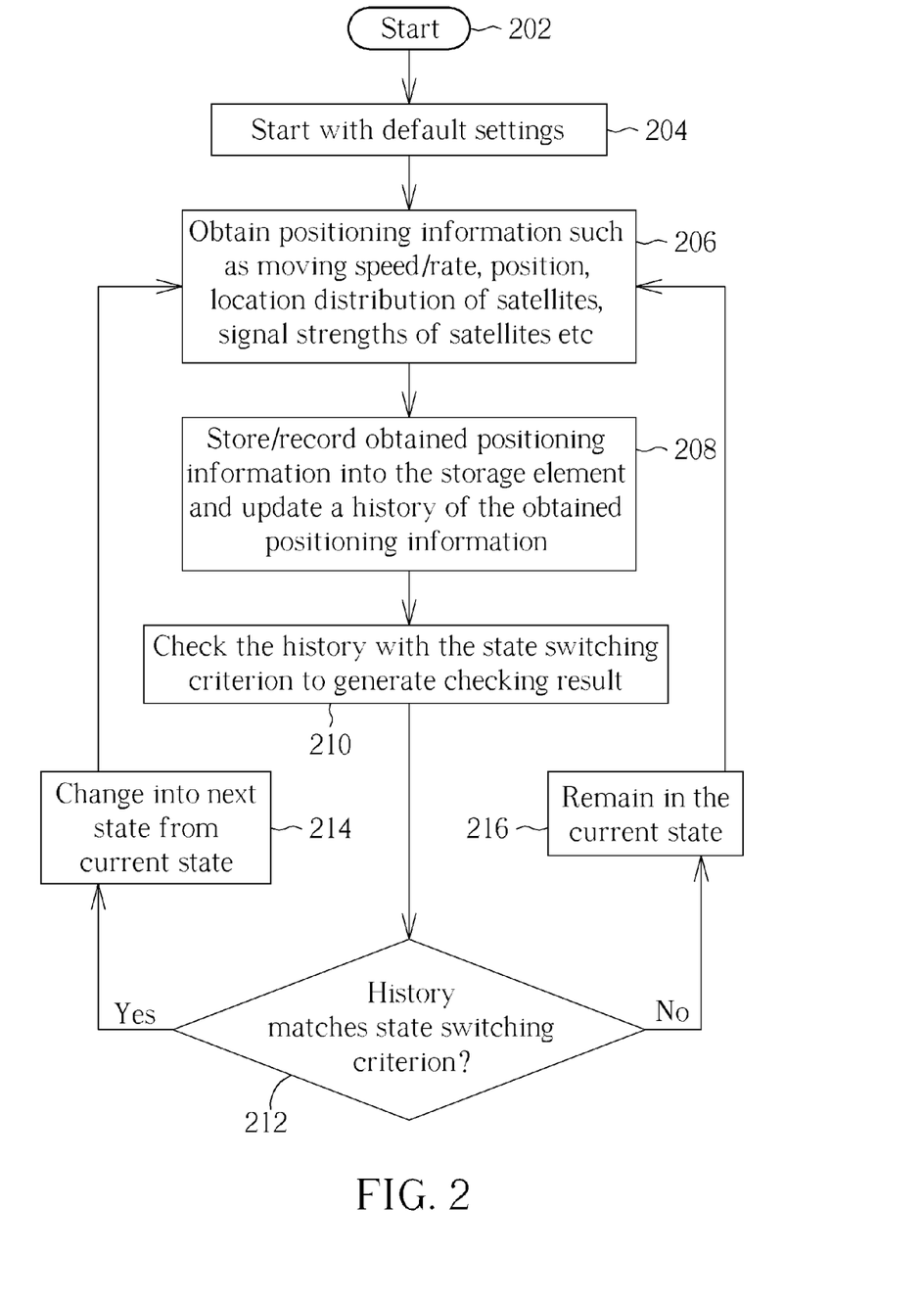
FIG. 2 is a flowchart of an operation for determining whether to switch the state of the GNSS receiver as shown in FIG. 1.

Please refer to FIG. 2, which is a flowchart of an operation for determining whether to switch the state of the GNSS receiver 100 as shown in FIG. 1. Provided that substantially the same result is achieved, the steps of the flowchart shown in FIG. 2 need not be in the exact order shown and need not be contiguous, that is, other steps can be intermediate. In addition, it should be noted that the steps of flowchart in FIG. 2 are merely used for illustrative purposes and should not intended to be a limitation of the present invention. The description of steps shown in FIG. 2 is detailed in the following:

Step 202: Start;

Step 204: The GNSS receiver 100 starts with default settings; for example, the GNSS receiver 100 starts and enters into a normal state corresponding to a normal power consumption condition;

Step 206: The positioning unit 108 obtains positioning information such as a moving speed/rate, a position, a location distribution of satellites, signal strengths of satellites etc;

Step 208: The positioning unit 108 stores/records the obtained positioning information into the storage element and updates a history of the obtained positioning information stored in the storage element;

Step 210: The controlling unit 110 checks the history with the state switching criterion to generate the checking result;

Step 212: The checking result indicates that the history matches the state switching criterion? If yes, this implies that the controlling unit 110 determines to cause the GNSS receiver 100 change the state, and the flow proceeds to Step 214, otherwise, this implies that the controlling unit 110 determines not to cause the GNSS receiver 100 change the state, and the flow proceeds to Step 216;

Step 214: The GNSS receiver 100 changes into a next state from a current state; and Step 216: The GNSS receiver 100 remains in the current state and does not change the state.

Figure 3:
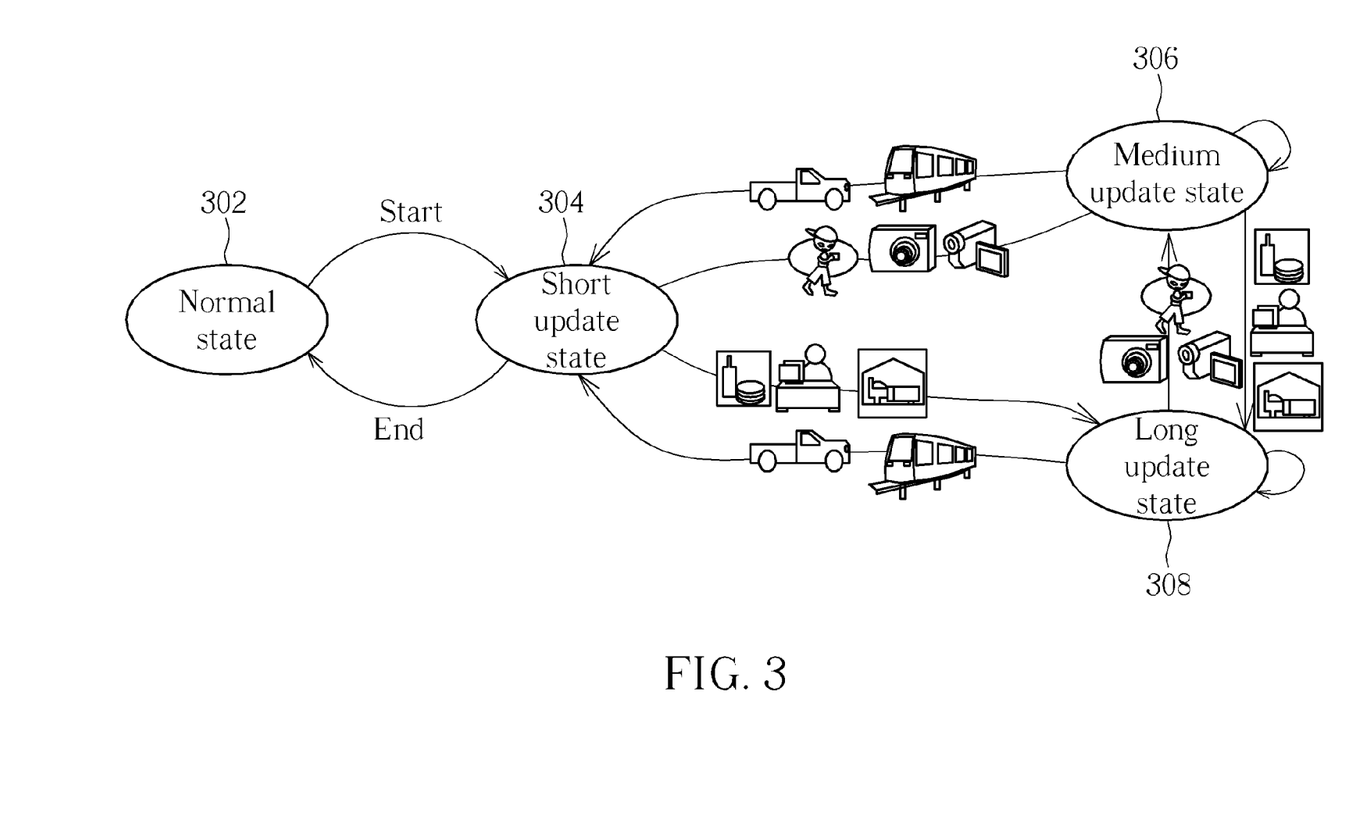
FIG. 3 is a simplified diagram illustrating state switching of the GNSS receiver as shown in FIG. 1 according to an embodiment of the present invention.

Please refer to FIG. 3, which is a simplified diagram illustrating state switching of the GNSS receiver 100 as shown in FIG. 1 according to an embodiment of the present invention. As shown in FIG. 3, the GNSS receiver 100 comprises the normal state 302 and a plurality of operation states including a short update state 304, a medium update state 306, and a long update state 308. The GNSS receiver 100 initially enters the normal state 302, and then enters the short update state 304 when starting to collect satellite information, i.e. one satellite information collection. After completing the satellite information collection, the GNSS receiver 100 exits the short update state 304 and then enters the normal state 302. The short update state 304, medium update state 306, and the long update state 308 are different operation states in which the GNSS receiver 100 collects/ updates satellite information respectively at different working frequencies. Assuming that the working period of each satellite information collection performed by the GNSS receiver 100 is substantially identical to another satellite information collection, these different operation states indicate different time intervals between the current satellite information collection performed by the GNSS receiver 100 and the next satellite information collection performed by the GNSS receiver 100. That is, a time interval is placed between the timing at which the GNSS receiver 100 starts to collect satellite information and the next timing at which the GNSS receiver 100 starts to collect/update satellite information again.

For example, when staying in the short update state 304, the GNSS receiver 100 is arranged to not start to collect/update satellite information after collecting/updating satellite information until a shorter time interval is ended. The GNSS receiver 100 staying in the short update state 304 performs the satellite information collection at a faster working frequency. When staying in the long update state 308, the GNSS receiver 100 is arranged to not start to collect/update satellite information after collecting/updating satellite information until a longer time interval is ended. The GNSS receiver 100 staying in the long update state 308 performs the satellite information collection at a slower working frequency. Similarly, when staying in the medium update state 306, the GNSS receiver 100 is arranged to not start to collect/update satellite information after collecting/updating satellite information until a medium time interval is ended. The GNSS receiver 100 staying in the medium update state 306 performs the satellite information collection at a middle working frequency. When staying in each update state, the controlling unit 110 is arranged to determine whether to switch from the current operation state to another operation state according to the checking result associated with the history of the obtained positioning information and the state switching criterion.

In a first embodiment, the positioning unit 108 provides the history of the obtained positioning information indicating a speed value of the GNSS receiver 100. The speed value is one of a current speed value of the GNSS receiver 100 and a resultant speed value that is recorded and calculated during a past time period. Since the GNSS receiver 100 may be installed within a vehicle or within a portable communication device carried by a person, the GNSS receiver 100 therefore may be moved from a location to another location and the speed value can be derived. The specific criterion is associated with two predetermined threshold values including a low threshold value TH1 and a high threshold value TH2. If the speed value indicated by the history of the obtained positioning information is lower than the low threshold value TH1, this implies that the user carrying the GNSS receiver 100 may move at a slower speed and the GNSS receiver 100 may be moved at the slower speed due to the user. The controlling unit 110 determines that it is not required for the GNSS receiver 100 to perform the satellite information collection/update frequently. The GNSS receiver 100 remains in the long update state 308 or switches from other update states 304 and 306 into the long update state 308. For example, the user may be in the office or in the house, so he/she may move slowly or may not move; the history of the obtained positioning information may indicate that the moving speed/rate of the GNSS receiver is very slow or almost zero. In this situation, the GNSS receiver 100 remains in the long update state 308, or switches from the other operation states 304 and 306 into the long update state 308 if the GNSS receiver 100 was originally in other operation states 304 and 306. Thus, if the GNSS receiver 100 currently is not under the long update state 308, the controlling unit 110 determines to switch from the other states to the long update state 308 when the speed value is lower than the low threshold value TH1.

Additionally, if the speed value indicated by the history of the obtained positioning information is higher than the high threshold value TH2, this implies that the user carrying the GNSS receiver 100 may move at a faster speed and the GNSS receiver 100 may be moved at the faster speed due to the user. The controlling unit 110 determines that it is necessary for the GNSS receiver 100 to perform the satellite information collection/update frequently. The GNSS receiver 100 remains in the short update state 304, or switches from other operation states 306 and 308 into the short update state 304 if the GNSS receiver 100 was originally in other operation states 306 and 308. For example, the user may drive a car or take a bus, so he/she may move fast; the history of the obtained positioning information may indicate that the speed value of the GNSS receiver is higher. In this situation, the GNSS receiver 100 remains in the short update state 304, or switches from the other states 306 and 308 into the short update state 304 if the GNSS receiver 100 was originally in other operation states 306 and 308. Thus, if the GNSS receiver 100 currently is not under the short update state 304, the controlling unit 110 determines to switch from the other states to the short update state 304 when the speed value is higher than the high threshold value TH2.

Additionally, if the speed value indicated by the history of the obtained positioning information is between the low threshold value TH1 and the high threshold value TH2, this implies that the user carrying the GNSS receiver 100 may move at a medium speed and the GNSS receiver 100 may be moved at the medium speed due to the user. The controlling unit 110 determines that it is appropriate for the GNSS receiver 100 to perform the satellite information collection/update moderately. The GNSS receiver 100 remains in the medium update state 306, or switches from other operation states 304 and 308 into the medium update state 306 if the GNSS receiver 100 was originally in other operation states 304 and 308. For example, the user may walk on the road, so he/she may move moderately; the history of the obtained positioning information may indicate that the moving speed/rate of the GNSS receiver is medium. In this situation, the GNSS receiver 100 remains in the medium update state 306, or switches from the other operation states 304 and 308 into the medium update state 306 if the GNSS receiver 100 was originally in other operation states 304 and 308. Thus, if the GNSS receiver 100 currently is not under the medium update state 306, the controlling unit 110 determines to switch from the other states to the medium update state 306 when the speed value is higher than the low threshold value TH1 and lower than the high threshold value TH2.

Figure 4:
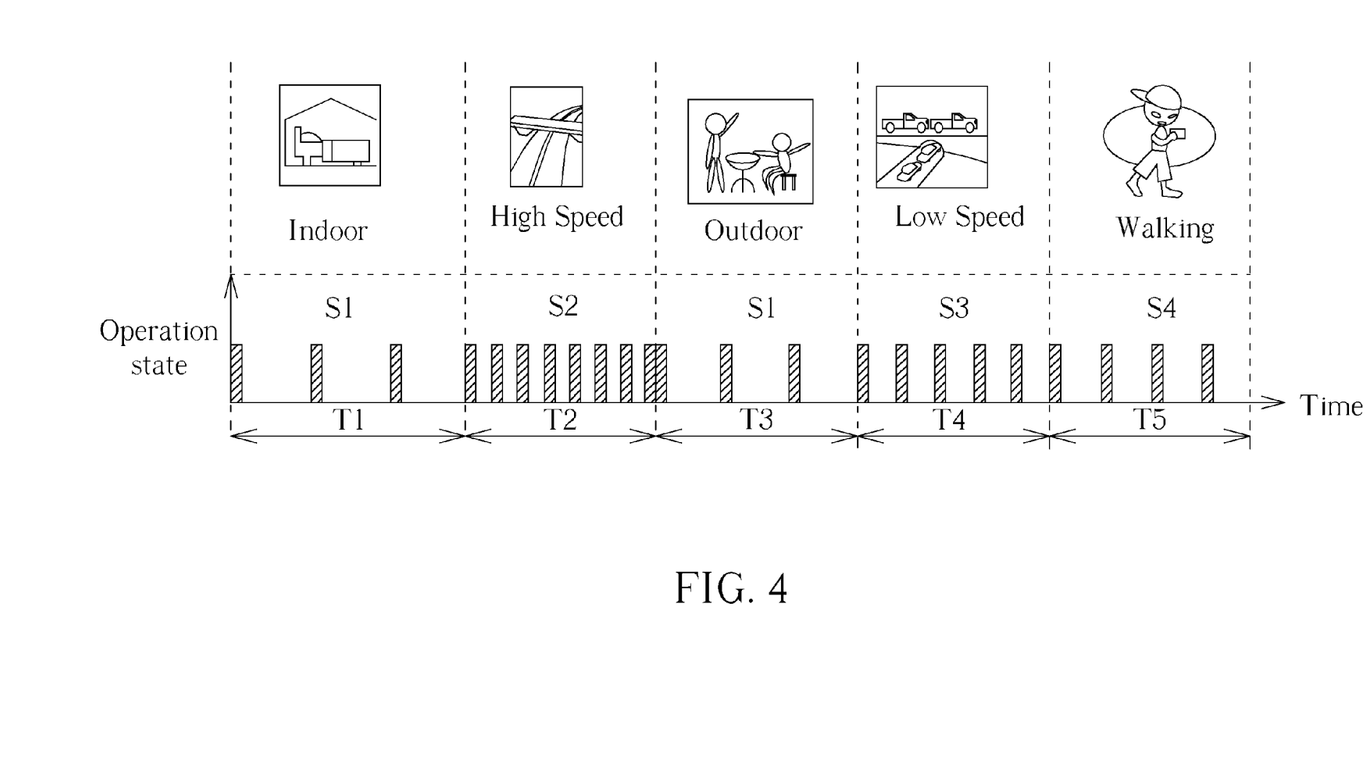
FIG. 4 is a diagram illustrating a detailed example of the GNSS receiver of FIG. 1 operating in different operation states corresponding to different user's behaviors.

Please refer to FIG. 4, which is a diagram illustrating a detailed example of the GNSS receiver 100 of FIG. 1 operating in different operation states corresponding to different user's behaviors. In this example, the GNSS receiver 100 is installed within a portable communication device that is taken with a user. The GNSS receiver 100 may move from a location to another location due to that the user moves. In this example, the user stays in his/her room, i.e. in an indoor environment, during a time period T1. The history of the obtained positioning information recorded by the positioning unit 108 indicates that the GNSS receiver 100 is not able to get valid positioning information. By checking the history of positioning information with the state switching criterion, the controlling unit 110 knows that the GNSS receiver 100 is not able to get valid positioning information. In this situation, it is not required for the GNSS receiver 100 to perform satellite information collection with a higher working frequency; that is, the interval between two satellite information collections performed by the GNSS receiver 100 needs not to be too short. The controlling unit 110 during the time period T1 is arranged to cause the GNSS receiver 100 stay in an operation state S1 in which the GNSS receiver 100 is arranged to regularly perform the satellite information collection with a minimum frequency.

Additionally, during the time period T2, the user carrying the GNSS receiver 100 may drive a car at a higher speed on the highway. The history of the obtained positioning information recorded by the positioning unit 108 indicates that the GNSS receiver 100 moves very fast during the time period T2. By checking the history of positioning information with state switching criterion, the controlling unit 110 knows that the GNSS receiver 100 moves at a higher moving speed/rate. In this situation, it is required for the GNSS receiver 100 to perform satellite information collection with a higher working frequency, so as to achieve enough accuracy of positioning; that is, the interval between two satellite information collections performed by the GNSS receiver 100 needs to be shorter. The controlling unit 110 during the time period T2 is arranged to cause the GNSS receiver 100 switch from the operation state S1 to another operation state S2 in which the GNSS receiver 100 is arranged to regularly perform the satellite information collection with a higher frequency such as a maximum frequency. Power consumption of the GNSS receiver 100 operating under the operation state S1 is significantly lower than power consumption of the GNSS receiver 100 operating under the operation state S2.

During the time period T3, the user carrying the GNSS receiver 100 may meet with his/her friends in an outdoor environment and have a talk with his/her friends. The history of the obtained positioning information recorded by the positioning unit 108 indicates that the GNSS receiver 100 moves very slow during the time period T3. The GNSS receiver 100 even may not move at all. By checking the history of positioning information with the state switching criterion, the controlling unit 110 knows that the GNSS receiver 100 moves at a very slow moving speed/rate. In this situation, it is not required for the GNSS receiver 100 to perform satellite information collection with a higher working frequency; that is, an interval between two satellite information collections performed by the GNSS receiver 100 needs not to be shorter. The controlling unit 110 during the time period T3 is arranged to cause the GNSS receiver 100 switch from the operation state S2 to the operation state S1 in which the GNSS receiver 100 is arranged to regularly perform the satellite information collection with the minimum frequency.

During the time period T4, the user carrying the GNSS receiver 100 may drive the car at a medium speed to go downtown. The history of the obtained positioning information recorded by the positioning unit 108 indicates that the GNSS receiver 100 moves moderately during the time period T4. By checking the history of positioning information with the state switching criterion, the controlling unit 110 knows that the GNSS receiver 100 moves at a medium moving speed/rate. In this situation, it is merely required for the GNSS receiver 100 to perform satellite information collection with a medium working frequency, so as to achieve appropriate accuracy of positioning; that is to say, an interval between two satellite information collections performed by the GNSS receiver 100 needs to be moderate. The controlling unit 110 during the time period T4 is arranged to cause the GNSS receiver 100 switch from the operation state S1 to another operation state S3 in which the GNSS receiver 100 is arranged to regularly perform the satellite information collection with a moderate frequency such as a middle frequency. Power consumption of the GNSS receiver 100 operating under the operation state S3 is between the power consumptions of the GNSS receiver 100 respectively operating under the operation states S1 and S2.

During the time period T5, the user carrying the GNSS receiver 100 may take a walk on the streets. The history of the obtained positioning information recorded by the positioning unit 108 indicates that the GNSS receiver 100 moves slowly during the time period T5. By checking the history of positioning information with the state switching criterion, the controlling unit 110 knows that the GNSS receiver 100 moves at a slower moving speed/rate. In this situation, it is merely required for the GNSS receiver 100 to perform satellite information collection with a lower working frequency, so as to achieve enough accuracy of positioning; that is, an interval between two satellite information collections performed by the GNSS receiver 100 needs not to be too shorter. The controlling unit 110 during the time period T5 is arranged to cause the GNSS receiver 100 switch from the operation state S3 to another operation state S4 in which the GNSS receiver 100 is arranged to regularly perform the satellite information collection with a lower frequency such as a low frequency. Power consumption of the GNSS receiver 100 operating under the operation state S4 is between the power consumptions of the GNSS receiver 100 respectively operating under the operation states S1 and S3.

In addition, in other embodiments, the history of the obtained satellite information recorded by the positioning unit 108 indicates a location distribution of satellites. Based on the location distribution of the satellites indicated by the history of positioning information, the controlling unit 110 can cause the GNSS receiver 100 to switch between operation states respectively corresponding to different power consumption conditions. Please refer to FIG. 5, which is a diagram illustrating an example of the GNSS receiver 100 of FIG. 1 operating in different operation states corresponding to different operating environments according to a second embodiment of the present invention. A location distribution (on the sky) of satellites that can be utilized by the GNSS receiver 100 for positioning may be limited to the local environment condition. For example, when the local environment condition indicates an open sky environment, the location distribution of satellites that can be utilized for positioning is not limited since most of the satellites seen by the GNSS receiver 100 are not blocked by any buildings. It is not required for the GNSS receiver 100 to use most of acquisition channel resources to search for information of new satellites. In this situation, the GNSS receiver 100 merely needs to use a few of the acquisition channels for searching for information of satellites. However, when the local environment condition indicates a deep urban environment, the location distribution of satellites that can be utilized for positioning is significantly limited since most of the satellites seen by the GNSS receiver 100 are blocked by tall buildings. It is required for the GNSS receiver 100 to use most of acquisition channel resources to search for information of new satellites. In this situation, the GNSS receiver 100 needs to use most of the acquisition channels for searching for information of satellites.

Figure 5:
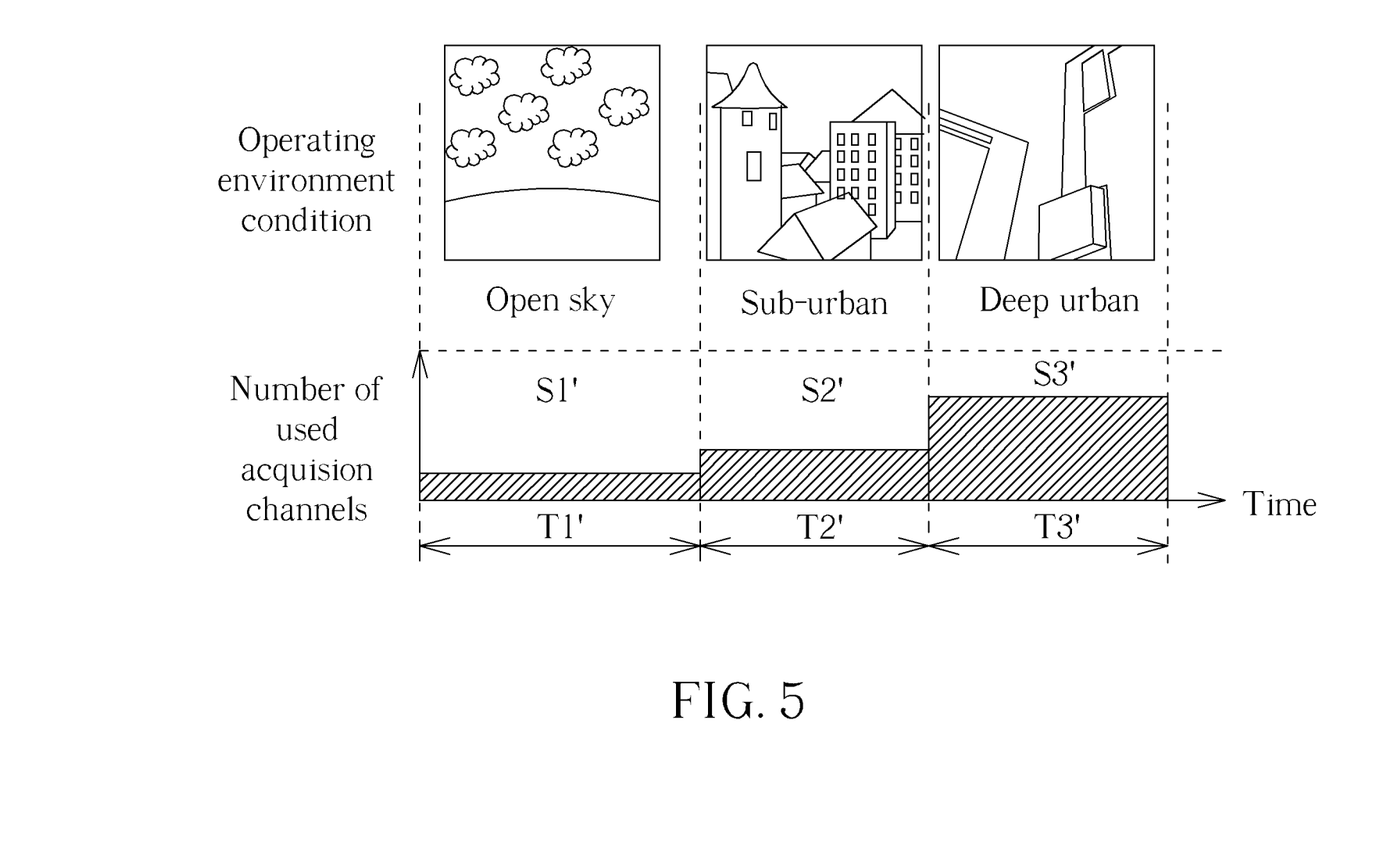
FIG. 5 is a diagram illustrating an example of the GNSS receiver of FIG. 1 operating in different operation states corresponding to different operating environments according to a second embodiment of the present invention.

As shown in FIG. 5, the GNSS receiver 100 includes three operation states corresponding to different operating environment conditions. It is assumed that the GNSS receiver 100 initially enters into the operation state S1' corresponding to the operating environment condition indicating the open sky environment. During the time period T1', the history of the obtained positioning information recorded by the positioning unit 108 indicates a location distribution of satellites seen by the GNSS receiver 100. Since the location distribution of satellites has a satellite distribution value that is higher than a high predetermined threshold value TH3 included in the state switching criterion, this implies that the GNSS receiver 100 is currently in the open sky environment. By checking the satellite distribution value with the predetermined threshold value TH3, the controlling unit 110 can know that the GNSS receiver 100 currently should remain in the operation state S1'. Thus, the controlling unit 110 is arranged to cause the GNSS receiver 100 to stay in the operation state S1' during the time period T1', without switching from the operation state S1' into another operation state. It should be noted that the satellite distribution value mentioned above is used for determining accuracy of a global positioning result of the GNSS receiver 100, and is one of schemes for deciding which environment under which the GNSS receiver 100 operates. This is not intended to be a limitation of the present invention.

During the time period T2', the history of the obtained positioning information recorded by the positioning unit 108 indicates another location distribution of satellites seen by the GNSS receiver 100. Since the location distribution of satellites has a satellite distribution value that is between the high threshold value TH3 and a low threshold value TH4 of the state switching criterion, this implies that the GNSS receiver 100 may move to a sub-urban environment form the open sky environment. By checking the satellite distribution value with the threshold values TH3 and TH4, the controlling unit 110 can know that the GNSS receiver 100 currently should be transited from the operation state S1' to the operation state S2' corresponding to a sub-urban environment condition. Thus, the controlling unit 110 is arranged to cause the GNSS receiver 100 to transit from the operation state S1' into the operation state S2', and the GNSS receiver 100 stays in the operation state S2' during the time period T2' without switching from the operation state S2' into another operation state.

During the time period T3', the history of the obtained positioning information recorded by the positioning unit 108 indicates another location distribution of satellites seen by the GNSS receiver 100. Since the location distribution of satellites has a satellite distribution value that is lower than the low threshold value TH4, this implies that the GNSS receiver 100 may move to a deep urban environment form the sub-urban environment. By checking the satellite distribution value with the threshold value TH4, the controlling unit 110 can know that the GNSS receiver 100 currently should be transited from the operation state S2' to the operation state S3' corresponding to the deep urban environment condition. Thus, the controlling unit 110 is arranged to cause the GNSS receiver 100 to transit from the operation state S2' into the operation state S3', and the GNSS receiver 100 stays in the operation state S3' during the time period T3' without switching from the operation state S3' into another operation state.

As mentioned above, when the history of the obtained positioning information matches a condition indicated by the state switching criterion due to the history of the received positioning information showing a location distribution of satellites with a specific distribution size that may be smaller, medium, or larger, the controlling unit 110 is arranged to cause the GNSS receiver to switch/transit from a current operation state into another operation state or cause the GNSS receiver 100 to stay in the current operation state. The different operation states shown in FIG. 5 correspond to different numbers of acquisition channels used to search for information of satellites. Since the used acquisition channels represents resource employed by the GNSS receiver 100, power consumed by the GNSS receiver 100 depends on how much resource employed by the GNSS receiver 100. That is, when the GNSS receiver 100 uses more acquisition channels to perform satellite information collection, most power will be consumed. When the GNSS receiver 100 uses few acquisition channels to perform satellite information collection, less power will be consumed. For example, power consumption of the GNSS receiver 100 operating in the state S1' corresponding to the open sky environment is lower than both power consumptions of the GNSS receiver 100 operating in the states S2' and S3' corresponding to the sub-urban environment and the deep urban environment. Thus, by dynamically switching the GNSS receiver 100 between the states S1'-S3' in response to the current operating environment condition, power resource can be adequately utilized and efficiently saved.

In practice, the history of the positioning information recorded by the positioning unit 108 indicates a value of the parameter 'Dilution of precision' (referred as to DOP) that can be used to represent a GNSS satellite geometry factor. When the value of the parameter DOP is higher, the size of the GNSS satellite geometry distribution is larger. When the value of the parameter DOP is lower, the size of the GNSS satellite geometry distribution is smaller. The controlling unit 110 can be arranged to compare the value of the parameter DOP with thresholds of the specific criterion so as to generate a checking result associated with the history of the obtained positioning information. This implementation is merely used for illustrative purposes, and is not intended to be a limitation of the present invention.

It should be noted that the controlling unit 110 can cause the GNSS receiver 100 to switch or transit between the operation states S1'-S3' in response to the different operating environment conditions. When staying in different operation states S1'-S3', the GNSS receiver 100 employs different numbers of acquisition channels to search for information of satellites so as to perform satellite information collection. Assuming that a working period for employing each acquisition channel to search for information of satellites is identical, the controlling unit 110 equivalently can adjust the total working period of the acquisition circuit 104 including the acquisition channels according to different operating environment conditions. The operation of dynamically adjusting the working period of the acquisition circuit 104 in response to the operating environment conditions can effectively make use of the power provided to the GNSS receiver 100. In other words, power can be efficiently saved.

Additionally, in a third embodiment, the positioning unit 108 provides/records the history of the obtained positioning information showing signal strength of satellite information received by the GNSS receiver 100. The GNSS receiver 100 includes a plurality of operation states such as a first operation state and a second operation state. When the history of the obtained positioning information matches the specific criterion due to the history of the received positioning information showing a first satellite signal strength value higher than a threshold value TH5, the controlling unit 110 determines that the first satellite signal strength value is enough to perform satellite information collection/update. In this situation, it is not required to employ too many resources such as more acquisition channels in the acquisition circuit 104 or more tracking channels in the tracking circuit 106 for searching information of satellites and tracking satellites. The controlling unit 110 is arranged to decrease the number of acquisition channels currently used by the acquisition circuit 104 or to decrease the number of tracking channels currently used by the tracking circuit 106. Equivalently, this operation decreases the working period of the acquisition circuit 104 or the working period of the tracking circuit 106. In order to decrease the number of acquisition/tracking channels currently used, the controlling unit 110 in practice is arranged to switch the GNSS receiver 100 from the first operation state to the second operation state wherein the GNSS receiver 100 employs few acquisition/tracking channels in the second operation state while the GNSS receiver 100 employs more acquisition/tracking channels in the first operation state. The power consumption of the GNSS receiver 100 operating under the second operation state is lower than the power consumption of the GNSS receiver 100 operating under the first operation state.

When the history of the obtained positioning information matches the specific criterion due to the history of the received positioning information showing a second satellite signal strength value lower than a threshold value TH6, the controlling unit 110 determines that the second satellite signal strength value may be not enough to perform satellite information collection/update. In this situation, it is required to employ additional resources such as more acquisition channels in the acquisition circuit 104 or more tracking channels in the tracking circuit 106 for searching information of satellites and tracking satellites. The controlling unit 110 is arranged to control the acquisition circuit 104 to employ more acquisition channels for searching information of more satellites or control the tracking circuit 106 to employ more tracking channels for tracking more satellites, so as to increase the satellite signal strength. Equivalently, this operation increases the working period of the acquisition circuit 104 or the working period of the tracking circuit 106. In order to increase the number of acquisition/tracking channels currently used, the controlling unit 110 in practice is arranged to switch the GNSS receiver 100 from the second operation state to the first operation state wherein the GNSS receiver 100 employs more acquisition/tracking channels in the first operation state while the GNSS receiver 100 employs few acquisition/tracking channels in the second operation state. The power consumption of the GNSS receiver 100 operating under the first operation state is higher than the power consumption of the GNSS receiver 100 operating under the second operation state.

Furthermore, the present invention can use location identification information to determine whether to change the operation state or not, so as to further reduce power consumption. For example, from the obtained positioning information, the GNSS receiver 100 can obtain a current location identification of the GNSS receiver. The GNSS receiver 100 checks if the current location identification is the same as a predetermined location identification. If yes, it means that the GNSS receiver may stay at the same location. In such a case, there is no need to keep tracking location and therefore the GNSS receiver will change the operation states to save power. That is, the obtained positioning information includes a location identification of the GNSS receiver 100 and the state switching criterion includes a predetermined location identification, wherein the controlling unit determines to switch from the first operation state to the second operation state when the obtained location identification of the GNSS receiver 100 is substantially the same as the predetermined location identification.

In addition, in other embodiments, positioning information may comprise other information, and the operation of obtaining positioning information may be executed by other steps. For example, the operation of obtaining positioning information may be implemented by using instant motion information of a motion sensor configured within an external electronic device such as a wearable device for the user to measure or detect whether the GNSS receiver 100 and the user move or not. If it is determined that the GNSS receiver 100 and user move, then the GNSS receiver 100 may be arranged to switch its operation state from the long update state to another operation state. The GNSS receiver 100 remains the long update state if it is determined that when the GNSS receiver 100 and user do not move.

In another example, the operation of obtaining positioning information may be implemented by employing location information from a WLAN device (e.g. location information of WiFi technology) to determine whether the GNSS receiver 100 and the user are or stay indoors. If it is determined that the GNSS receiver 100 and the user are indoors, then the GNSS receiver 100 may be arranged to switch its operation state from other states to the long update state. If it is determined that the GNSS receiver 100 and the user have stay indoors for a period, then the GNSS receiver 100 may remain its operation state at the long update state. Additionally, the operation of obtaining positioning information may be implemented by employing location information of Bluetooth technology to determine whether the GNSS receiver 100 and user are or stay indoors.

In another example, the operation of obtaining positioning information may be implemented by employing location information of a UV (ultraviolet) light sensor included by an external electronic device such as a wearable device for the user to determine whether the GNSS receiver 100 and user are or stay indoors. The result of UV light sensor usually shows that the intensity of UV light indoors is lower than that outdoors. If it is determined that the GNSS receiver 100 and the user are indoors, then the GNSS receiver 100 may be arranged to switch its operation state from other states to the long update state. If it is determined that the GNSS receiver 100 and the user have stay indoors for a period, then the GNSS receiver 100 may remain its operation state at the long update state.

It should be noted that the controlling unit 110 can also be arranged to adjust power consumption of the RF front-end circuit 102 when the history of the obtained positioning information recorded by the positioning unit 108 matches the specific criterion. In practice, the controlling unit 110 can adjust a working period of one satellite information collection performed by the RF front-end circuit 102 or an interval between two satellite information collections performed by the RF front-end circuit 102. Since the GNSS receiver 100 may include any circuit elements in addition to the RF front-end circuit 102, acquisition circuit 104, and the tracking circuit 106, the controlling unit 110 can used for adjusting power consumption of at least one circuit element included within the GNSS receiver 100 by adjusting the working period of one satellite information collection performed by the at least one circuit element or the interval between two satellite information collections performed by the at least one circuit element, so as to make effective use of power. In addition, in another embodiment, the power of GNSS receiver 100 can be turned off to save more power.

Please note that the GNSS receiver 100 can be configured to include a plurality of accuracy settings. The user operating the GNSS receiver 100 can select his/her desired accuracy setting. Under a condition of satisfaction of the selected accuracy setting, the controlling unit 110 of the GNSS receiver 100 is arranged to automatically determine an appropriate time interval between two satellite information collections performed by the GNSS receiver 100 according to the moving speed/rate indicated by the history of the positioning information recorded by the positioning unit 108. This operation of automatically determining the frequency of satellite information collection/update also falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a global navigation satellite system (GNSS) receiver, wherein the GNSS receiver is operated in a first operation state, comprising:
    providing a state switching criterion;
    obtaining at least one positioning information;
    determining whether to switch from the first operation state to a second operation state according to the obtained positioning information and the state switching criterion, wherein a power consumption of the GNSS receiver operating under the first operation state and the second operation state is different;
    wherein the obtained positioning information includes location information from a WLAN device, a Bluetooth device, or a UV light sensor, the WLAN device, the Bluetooth device, and the UV light sensor being distinct from the GNSS receiver.

2. The method of claim 1, wherein when the obtained positioning information includes the speed value of the GNSS receiver, the state switching criterion includes a first predetermined threshold value, wherein the determining step determines to switch from the first operation state to the second operation state when the speed value of the GNSS receiver is lower than the first predetermined threshold value.

3. The method of claim 2, wherein the speed value is one of a current speed value of the GNSS receiver and a resultant speed value that is recorded and calculated during a past time period.

4. The method of claim 1, wherein when the obtained positioning information includes the speed value of the GNSS receiver, the state switching criterion includes a second predetermined threshold value, wherein the determining step determines to switch from the first operation state to the second operation state when the speed value of the GNSS receiver is higher than the second predetermined threshold value.

5. The method of claim 1, wherein when the obtained positioning information includes the satellite distribution value of the GNSS receiver, the state switching criterion includes a third predetermined threshold value, wherein the determining step determines to switch from the first operation state to the second operation state when the satellite distribution value of the GNSS receiver is lower than the third predetermined threshold value.

6. The method of claim 1, wherein when the obtained positioning information includes the satellite distribution value of the GNSS receiver, the state switching criterion includes a fourth predetermined threshold value, wherein the determining step determines to switch from one of the first and second operation states to a third operation state when the satellite distribution value of the GNSS receiver is lower than the fourth predetermined threshold value.

7. The method of claim 1, wherein when the obtained positioning information includes the satellite signal strength value of the GNSS receiver, the state switching criterion includes a fifth predetermined threshold value, wherein the determining step determines to switch from the first operation state to the second operation state when the satellite signal strength value of the GNSS receiver is higher than the fifth predetermined threshold value.

8. The method of claim 1, wherein when the obtained positioning information includes the satellite signal strength value of the GNSS receiver, the state switching criterion includes a sixth predetermined threshold value, wherein the determining step determines to switch from the first operation state to the second operation state when the satellite signal strength value of the GNSS receiver is lower than the sixth predetermined threshold value.

9. The method of claim 1, wherein when the obtained positioning information includes the location identification of the GNSS receiver, the state switching criterion includes a predetermined location identification, wherein the determining step determines to switch from the first operation state to the second operation state when the obtained location identification of the GNSS receiver is substantially the same as the predetermined location identification.

10. The method of claim 1, further comprising:
    reducing a power consumption of the GNSS receiver by disabling the GNSS receiver.

11. The method of claim 1, wherein the GNSS receiver includes a radio-frequency (RF) front-end circuit, an acquisition circuit and a tracking circuit, the method further comprising:
    adjusting a power consumption of at least one of the RF front-end circuit, the acquisition circuit and the tracking circuit.

12. The method of claim 11, wherein the step of adjusting the power consumption comprises:
    turning off power of the GNSS receiver.

13. The method of claim 11, wherein the adjusting step comprising:
    adjusting a working period of one satellite information collection performed by the at least one circuit.

14. The method of claim 11, wherein the adjusting step comprising:
    adjusting an interval between two satellite information collections performed by the at least one circuit.

15. The method of claim 11, wherein the adjusting step comprising:
    adjusting a number of acquisition channels used for searching for information of satellites.

16. The method of claim 11, wherein the adjusting step comprising:
    adjusting a number of tracking channels used for tracking satellites.

17. A global navigation satellite system (GNSS) receiver, wherein the GNSS receiver is operated in a first operation state, comprising:
    a memory for providing a state switching criterion;
    a positioning unit for obtaining a positioning information;
    a controlling unit for determining whether to switch from the first operation state to a second operation state according to the obtained positioning information and the state switching criterion, wherein a power consumption of the GNSS receiver operating under the first operation state and the second operation state is different;

wherein the obtained positioning information includes location information from a WLAN device, a Bluetooth device, or a UV light sensor, the WLAN device, the Bluetooth device, and the UV light sensor being distinct from the GNSS receiver.

18. The GNSS receiver of claim 17, wherein when the obtained positioning information includes the speed value of the GNSS receiver, the state switching criterion includes a first predetermined threshold value, wherein the controlling unit determines to switch from the first operation state to the second operation state when the speed value of the GNSS receiver is lower than the first predetermined threshold value.

19. The GNSS receiver of claim 18, wherein the positioning unit is arranged to record a current speed value of the GNSS receiver as the speed value or to record and calculate a resultant speed value during a past time period.

20. The GNSS receiver of claim 17, wherein when the obtained positioning information includes the speed value of the GNSS receiver, the state switching criterion includes a second predetermined threshold value, wherein the controlling unit determines to switch from the first operation state to the second operation state when the speed value of the GNSS receiver is higher than the second predetermined threshold value.

21. The GNSS receiver of claim 17, wherein when the obtained positioning information includes the satellite distribution value of the GNSS receiver, the state switching criterion includes a third predetermined threshold value, wherein the controlling unit determines to switch from the first operation state to the second operation state when the satellite distribution value of the GNSS receiver is lower than the third predetermined threshold value.

22. The GNSS receiver of claim 17, wherein when the obtained positioning information includes the satellite distribution value of the GNSS receiver, the state switching criterion includes a fourth predetermined threshold value, wherein the controlling unit determines to switch from one of the first and second operation states to a third operation state when the satellite distribution value of the GNSS receiver is lower than the fourth predetermined threshold value.

23. The GNSS receiver of claim 17, wherein when the obtained positioning information includes the satellite signal strength value of the GNSS receiver, the state switching criterion includes a fifth predetermined threshold value, wherein the controlling unit determines to switch from the first operation state to the second operation state when the satellite signal strength value of the GNSS receiver is higher than the fifth predetermined threshold value.

24. The GNSS receiver of claim 17, wherein when the obtained positioning information includes the satellite signal strength value of the GNSS receiver, the state switching criterion includes a sixth predetermined threshold value, wherein the controlling unit determines to switch from the first operation state to the second operation state when the satellite signal strength value of the GNSS receiver is lower than the sixth predetermined threshold value.

25. The GNSS receiver of claim 17, wherein when the obtained positioning information includes the location identification of the GNSS receiver, the state switching criterion includes a predetermined location identification, wherein the determining step determines to switch from the first operation state to the second operation state when the obtained location identification of the GNSS receiver is substantially the same as the predetermined location identification.

26. The GNSS receiver of claim 17, wherein power consumption of the GNSS receiver is reduced by disabling an operation of the GNSS receiver.

27. The GNSS receiver of claim 17, wherein the GNSS receiver includes a radio-frequency (RF) front-end circuit, an acquisition circuit and a tracking circuit, wherein a power consumption of at least one of the RF front-end circuit, the acquisition circuit and the tracking circuit is adjusted.

28. The GNSS receiver of claim 27, wherein power of the GNSS receiver is turned off when the power consumption is adjusted.

29. The GNSS receiver of claim 27, wherein a working period of one satellite information collection performed by the at least one of the RF front-end circuit, the acquisition circuit and the tracking circuit is adjusted.

30. The GNSS receiver of claim 27, wherein an interval between two satellite information collections performed by the at least one of the RF front-end circuit, the acquisition circuit and the tracking circuit is adjusted.

31. The GNSS receiver of claim 27, wherein a number of acquisition channels used for searching for information of satellites are adjusted.

32. The GNSS receiver of claim 27, wherein a number of tracking channels used for tracking satellites is adjusted.

* * * * *